(No Model.) 4 Sheets—Sheet 1.
W. H. JONES & H. L. RANDALL.
CASH AND PARCEL CARRIER.
No. 304,734. Patented Sept. 9, 1884.
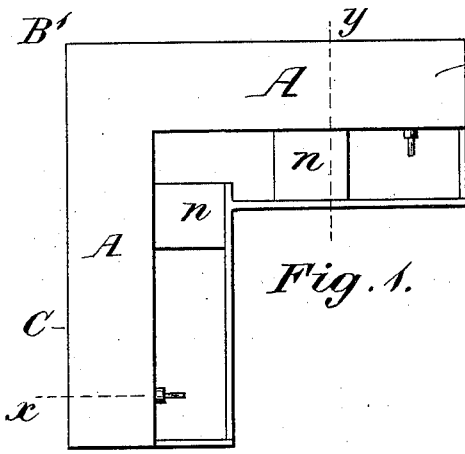
Fig. 1.
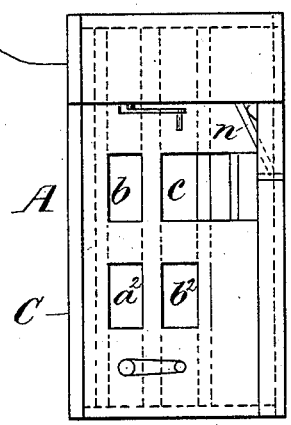
Fig. 2.
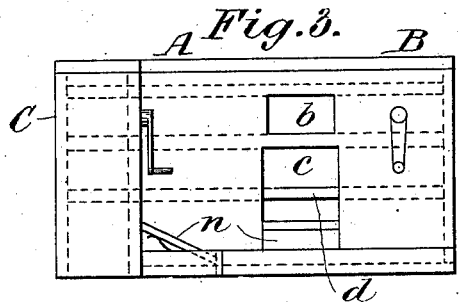
Fig. 3.
Fig. 4.
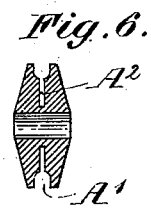
Fig. 6.
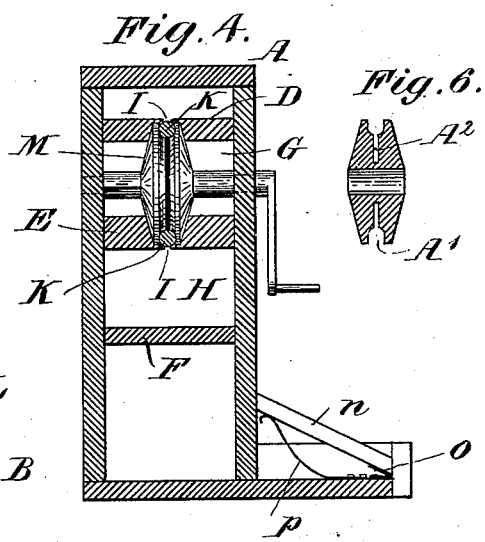
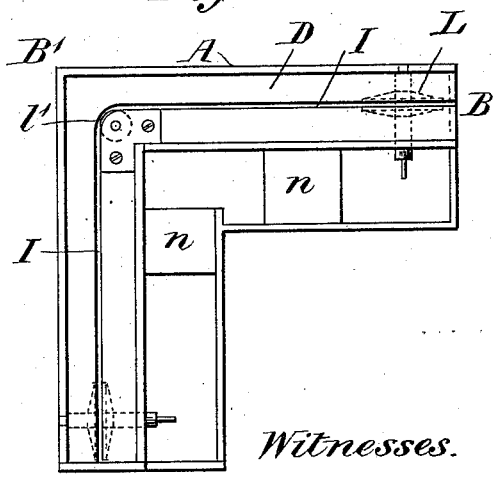
Fig. 5.
Witnesses.
W. Decarie
A. A. Simpson
Inventors
W. H. Jones
H. L. Randall
Per
Charles G. J. Simpson
Attorney
N. PETERS, Photo-Lithographer, Washington, D. C.

(No Model.) 4 Sheets—Sheet 2.
W. H. JONES & H. L. RANDALL.
CASH AND PARCEL CARRIER.
No. 304,734. Patented Sept. 9, 1884.
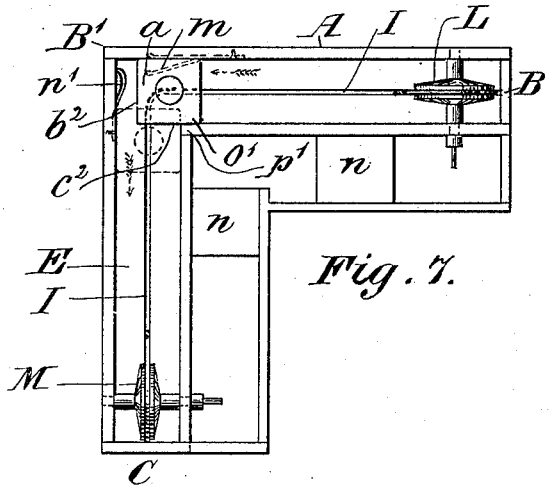
Fig. 7.
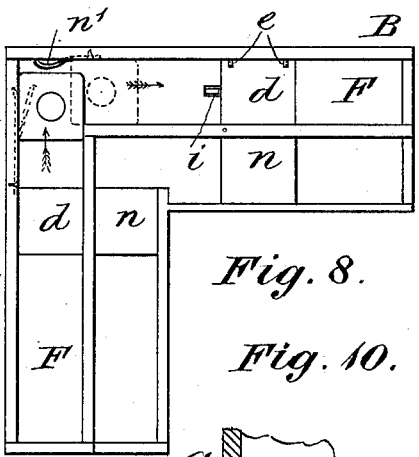
Fig. 8.
Fig. 10.
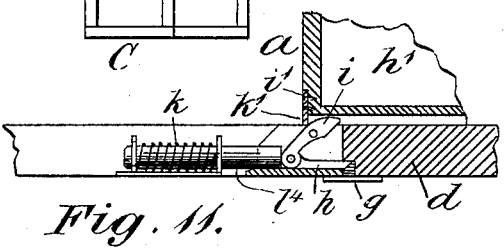
Fig. 11.
Fig. 9.
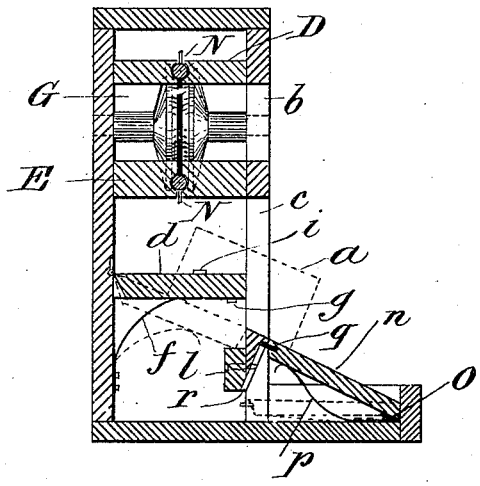
Witnesses
W. Decarie
A. A. Simpson.
Inventors
W. H. Jones.
H. L. Randall
Per
Charles G. C. Simpson
Attorney (No Model.) 4 Sheets—Sheet 3.
W. H. JONES & H. L. RANDALL.
CASH AND PARCEL CARRIER.
No. 304,734. Patented Sept. 9, 1884.
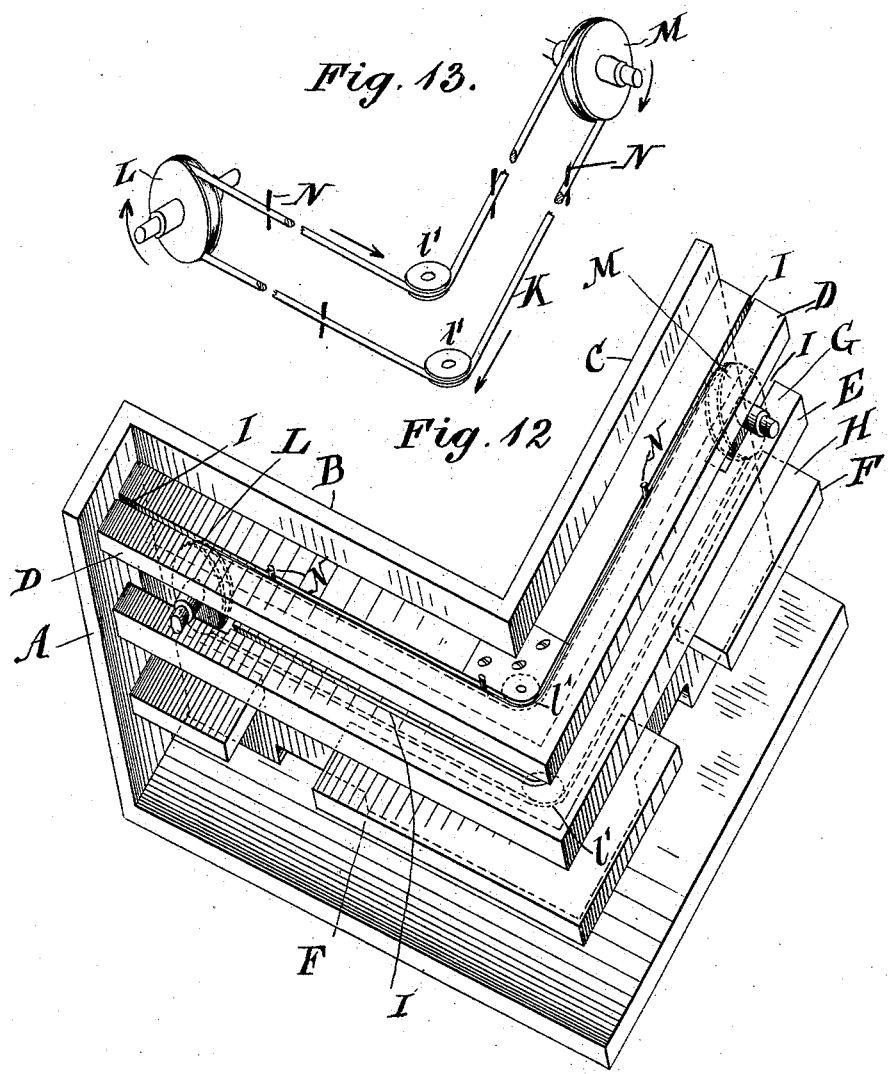
Witnesses.
W. Decarie
A. A. Simpson
Inventors
W. H. Jones
H. W. Randall
Per Charles G. L. Simpson
Attorney (No Model.) 4 Sheets—Sheet 4.
W. H. JONES & H. L. RANDALL
CASH AND PARCEL CARRIER.
No. 304,734. Patented Sept. 9, 1884.
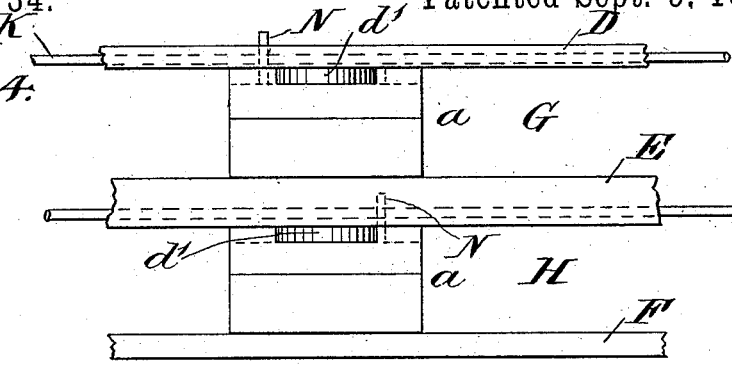
Fig. 14.
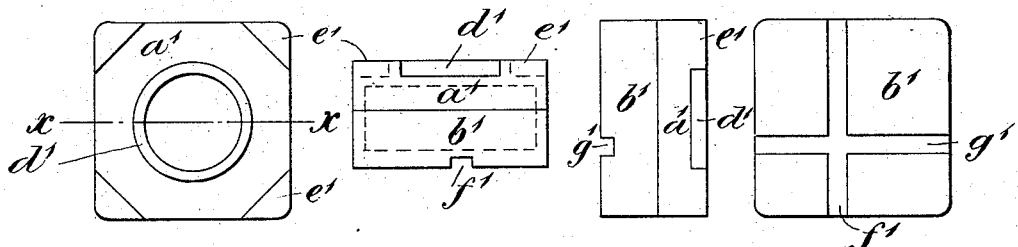
Fig. 15. Fig. 16. Fig. 17. Fig. 18.
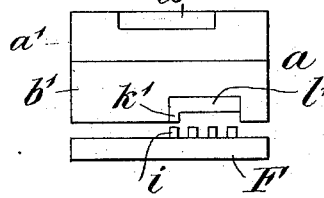
Fig. 21.
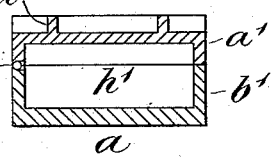
Fig. 19.
Fig. 20.
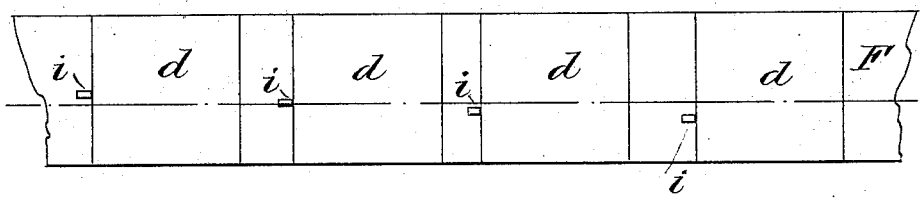
Witnesses
W. Decarie
A. A. Simpson
Inventors
W. H. Jones,
H. L. Randall,
Per Charles G. C. Simpson
Attorney

UNITED STATES PATENT OFFICE.

WILLIAM H. JONES AND HERBERT L. RANDALL, OF MONTREAL, QUEBEC, CANADA; SAID JONES ASSIGNOR TO SAID RANDALL.

CASH AND PARCEL CARRIER.

SPECIFICATION forming part of Letters Patent No. 304,734, dated September 9, 1884.

Application filed July 22, 1884. (No model.)

*To all whom it may concern:*

Be it known that we, WILLIAM HENRY JONES and HERBERT LUVILL RANDALL, both of the city of Montreal, in the District of Montreal, Province of Quebec, Canada, have invented new and useful Improvements in Cash and Parcel Carriers; and we do hereby declare that the following is a full, clear, and exact description of the same.

This invention has reference to the construction and arrangement of a mechanism by which cash and parcels of goods may be conveyed from one location to another within a store or shop, to obviate the necessity of having persons running about in such store or shop for the purpose of carrying said cash and parcels from one location to another.

The particular features of the construction forming the present invention will be hereinafter set forth and claimed.

In the drawings hereunto annexed similar letters of reference indicate like parts, and Figure 1 is a plan of a construction embodying our invention. Figs. 2 and 3 are side elevations of the construction shown in Fig. 1. Fig. 4 is a vertical cross-section taken on line $x$, Fig. 1. Fig. 5 is a plan, being a reproduction of the plan shown in Fig. 1, but in this case with the top removed to show the plan of the upper inner division or shelf D. Fig. 6 is a detail section of driving-pulleys. Fig. 7 is a plan, being a reproduction of the plan shown in Fig. 1, but in this case with the trap and upper shelf D removed, showing a plan of the second inner division or shelf E; and Fig. 8 is a similar plan showing in this figure the plan of the lower shelf, F. Fig. 9 is a vertical cross-section on line $y$, Fig. 1. Fig. 10 is a diagram showing how the trap-doors are operated. Fig. 11 shows a plan of the pawls, &c., by which the trap-doors are held up. Fig. 12 is an isometrical view of the construction embodying our invention with part of outer casting and the trap-doors removed. Fig. 13 is a diagram showing general arrangement of pulleys and band. Fig. 14 is a diagram showing the manner of propelling the boxes in which cash, parcels, &c., are contained. Fig. 15 is a plan of the top, Figs. 16 and 17 are side elevations, Fig. 18 a plan of the bottom, and Fig. 19 a vertical section on line $x\ x$, Fig. 15, of the box $a$, in which are carried the cash and parcels, &c., requiring to be removed from one location to another. Figs. 20 and 21 are diagrams to illustrate the operation and arrangement of parts.

We will first, for clearness and convenience, give a general description of our invention and then proceed to describe particularly in detail the parts of which it is composed.

Our invention consists a casing situated on or above the floor of the shop or store in which it is placed, as desired. This said casing may extend in a straight line from any one point to any other point; but as in by far the majority of cases it will be necessary to form it with at least one angle, we have so delineated it, and more especially so because certain provisions have to be made in the construction on account of the angle at B', which would be quite unnecessary if the casing A is made in a straight line. The said casing is divided horizontally by three shelves into what are, in fact, two rectangular tubes of equal dimensions and parallel sides. In one of these tubes rectangular boxes are caused to travel in the one direction, while in the other tube the same boxes are caused to travel in the other direction. One of the said tubes is provided with traps or trap-doors in it, by which, when the box has arrived at the proper place, it falls out of the tube onto a small platform to receive it, the traps being automatically operated by the boxes traveling in the tube, and so arranged that the box belonging or fitted for any particular trap will only open that trap to which it so belongs. The boxes are caused to travel in the said tubes by means of a band operated by pulleys and provided with projections, and at the angles of the tubes springs are employed to assist in causing the onward motion of the boxes.

Letter A is the casing, which, as shown, consists of two branches, B and C, at right angles to each other. Within the casing A are three shelves, D, E, and F, forming two tubes, G and H, of equal height and width and parallel sides from one end of the casing A to the other. The shelves D and E are provided with slots I, extending completely through the said shelves; and these slots are grooved out to receive and hold between them a band, K, of much greater diameter than the width of the slots I, so that the said band with projections N are perfectly guided and retained in position by the said slots, as shown in Figs. 4 and 9. The shelf F is provided with trap-doors, which will be hereinafter particularly described.

Between the shelves D and E are situated two pulleys, L and M, carried on axles journaled in the sides of the tube G and operated by crank-handles, or, if desired, by driving wheels or gears in the ordinary well-known way. This may be according to whether the pulleys are to be operated by hand or power of a motor. The band K is provided with projections N of such length that they project above and below the shelf D, and below the shelf E. (See Figs. 9, 12, and 14.)

It will be observed that the shelf E is made very much thicker than the shelf D, and that the band K does not pass through the center of it. This is to prevent the upper end of the projections N while passing through the shelf E from extending into the tube G, while the lower ends of the projections N extend down and project within the tube H. Now, this extending of the projections N into the top of the tubes G and H, as shown in Figs. 9 and 14, enables them to engage with a suitable box, $a$, and when the box $a$ is placed in the tube G to move it in the one direction, and when in the tube H in the other direction, as indicated by the arrows. The tube G is provided with any desired number of openings $b$, situated any desired distance along its length, and the tube H is provided with corresponding openings, $c$, situated immediately below the openings $b$. These are made the required size to allow the box $a$ to pass freely through these openings. If the tubes G and H are straight, and the pulleys L and M are revolved in the direction shown by the arrows in Fig. 13, the band K and projections N will be caused to travel as indicated by the arrows in Figs. 13 and 14, thus propelling the box $a$ toward the pulley M in the tube G, while, when the box is placed in the tube H, the projections N propel the box toward the pulley L.

In the construction of the pulleys L and M as shown in Fig. 6 it will be observed that they are not only provided with grooves A' for the reception of the band K, but such grooves are deepened by a narrow recess, $A^2$, to accommodate the free passing of the projections N.

Having thus far described the tubes G and H and the means of propelling a box or boxes within them in a general way, we will now describe more particularly the traps for causing the boxes to automatically slide out of the tube H.

The shelf F consists of a flat surface extending from end to end of the casing A, and forming the bottom of the tube H, except where the openings $c$ occur, at each of which a trap or trap-door, $d$, hinged as shown at $e$, is placed, and when up in place the traps are even with the shelf F and form the continuation of it.

$f$ are springs under the traps $d$, of such force that each spring will hold up a trap in its place when the trap is not loaded with the weight of the box $a$.

$g$ is a plate attached on the trap $d$ to prevent the spring $f$ from raising the trap too high.

$h$ is a pawl operated by a lever, $i$, and spring $k$, acting through the medium of a bolt, $l^1$. The lever $i$, being depressed by the box $a$ passing over it, (the arrangement of the box $a$ for this purpose will be hereinafter described,) causes the end of pawl $h$ to be withdrawn from under the trap and allows it to fall to the position indicated by dotted lines in Fig. 9, in which position it is retained by a batten, $l$, secured on the casing A. In this position the inclination of the trap is such that the box $a$ will slide forward, as indicated, and pass onto a platform, $n$, hinged at $o$ to an extension of the bottom of the casing A. The platforms $n$ are each held up in the position shown by a spring, $p$, of such force as is required for this purpose when the platform is empty, (see Fig. 9;) but when loaded with the weight of the box $a$ it will become depressed to about the position shown by dotted lines in that figure.

$q$ is a plate inserted in the edge of the platform $n$ and projecting into a groove, $r$, in the ordinary way, so that by the groove extending only the required length the platform $n$ is prevented from being raised higher than the position shown in Fig. 9.

$a$ is a rectangular box, which is square in plan, but with the corners rounded off, made in two parts, $a'$ and $b'$, hinged together at $c'$ in such a manner that the hinges will not project beyond the surface of the side of the box. The top $a'$ is provided with a circular projection, $d'$, also corner projections $e'$ of equal height with the projection $d'$. The circular projection $d'$ is formed for the projections N of the band K to engage with, and the projections $e'$ are to steady the box as it travels in the tubes, in which it forms a free sliding fit. The bottom $b'$ of the box is provided with two grooves, $f'$ and $g'$. These grooves are so situated and of such size that they enable the box to pass through the tube H without coming in contact with any of the levers $i$ (see Figs. 8, 9, 10, 20, and 21) projecting above the shelf F, and thus operate the traps $d$.

$h'$ is the ordinary space within the box $a$, in which the cash and parcels or goods will be placed.

We would here explain that a box, $a$, will be provided for each of the openings $b$ or $c$, and these boxes must be so arranged and constructed that they will only open the trap $d$, to which each particular box $a$ belongs, and for that purpose the following arrangement is made.

In Fig. 20 we will suppose that four traps are placed in a row at various distances in the shelf F. As indicated, the levers $i$ are situated at a variety of distances from the front or back of the traps, so that a line parallel with the shelf F, drawn through any one of the said levers $i$, will not come in contact with any of the other levers $i$, so that by attaching to the box $a$ a small plate, $i'$, having a projection, $k'$, to agree with the particular position of the lever $i$ of the trap $d$, to which the box belongs, it will only operate that particular lever $i$ and trap. This will be more clearly understood by reference to Figs. 20 and 21, where the shelf F is shown in plan and end elevation.

In Fig. 21 the box $a$ is represented as raised a little above the shelf, to show the projection of the levers $i$ more clearly; but it will be from Fig. 10 clearly understood that if the box is placed down and moved along over and upon the shelf F its projection $k'$ will operate one only of the four levers $i$, and by changing the position of the projections $k'$ on the respective boxes $a$ they will operate the respective levers and traps required.

If the casing A and the tubes G and H were made in a straight line only, the task of describing the parts and their operation would now be very nearly at an end. We will, therefore, now proceed to describe the construction and arrangement necessary for enabling the box $a$ to pass the angle B', Fig. 1, in the casing A.

The slots I in the shelves D and E are at the angle B' provided with pulleys $l'$, grooved to agree with the half-section of the slot I, by which means the projections N and band K can readily pass the angle.

The passing of the angle B' by the box $a$ is arranged as follows: We will suppose that the box $a$ is placed in the opening $b$ of the tube G in the branch B, and that by being caught by one of the projections N (see Fig. 14) it is propelled along the tube G until it reaches the position shown in Fig. 7, where, having come in contact with the spring $m'$, it has depressed that spring, and when the box $a$ has nearly arrived at the angle B' it comes in contact with a second spring, $n'$, which it compresses. This spring is for the purpose of causing the corner $o'$ of the box to positively clear the corner $p'$ of the casing. Although we prefer to use this spring, yet by a greater rounding off of the corner $o'$, or corner $p'$, or both of these corners, the said spring $n'$ may be dispensed with. It is, however, desirable not to decrease the size of the box $a$ by very extensive rounding off at the corner, for which reason the spring $n'$ is used. As soon as the box $a$ is completely in the angle B', the spring $m'$ shoots it forward down the branch C a short distance, while the projection N, that has been propelling the box $a$, travels round the pulley $l'$, and, coming up to the box, propels it to the opening $a^2$. It will be observed that when the box $a$ was traveling in the branch B the side $b^2$ traveled foremost, but as soon as the box began to travel in the branch C the side $c^2$ travels foremost. It is for this reason that the bottom of the box is provided with two grooves, $g'$ and $f'$, to clear the projections of levers $i$ on the shelf F in both branches B and C.

The opening $a^2$ may be a mere opening in the tube G, of suitable size to remove the box $a$ from the tube, or it may be provided with a trap similar to those already described as $d$.

By providing the box $a$ with a projection, $d'$, very much less than the size of the box, it enables the spring $m'$ to operate the box when passing the angle B' with very much less motion of the said spring than would be required if the top of the box were made the full size of the box throughout. In the above-described operation of moving the box from the opening $b$ in the branch B to the opening $a^2$ in the branch C, the clerk after he has made a sale puts the goods purchased and the money to pay for them into the box $a$, and places the box in the opening $b$, as above described. Then by any desired signal to the person in charge of the invention such person causes the band K to be put in motion and draw the box in the above-described manner to the opening $a^2$, where it is taken out, the goods, &c., taken out, packed up in a parcel, and, if required, the necessary change of money made. The said parcel and change are then returned to the box, and the box placed in the opening $b^2$ in the tube H. When the box arrives at the opening $c$, to which it belongs, the trap operates in the manner already described, and lets the box slide out onto the platform $n$.

Having now described the construction and operation of our invention, what we claim, and wish to secure by Letters Patent, is as follows:

1. The combination of the tube G, having openings $a^2$ and $b$, tube H, having openings $c$ $b^2$, traps $d$, levers $i$, and pawl $h$, boxes $a$, having projections $k'$, with pulleys L M, and band K, having projections N, the whole substantially as described.

2. The combination of the tubes G and H, provided with slots I, openings $b$ $a^2$ $c$ $b^2$, as described, pulleys L, M, and $l'$, band K, having projections N and springs $m'$, traps $d$, operated as described, with box $a$, the whole substantially as described.

3. The combination of the tube G, having openings $b$ $a^2$, tube H, having openings $c$ $b^2$, and traps $d$, constructed as described and shown, with box $a$, operated as described, and platform $n$, the whole constructed and arranged substantially as described.

4. The combination, in a tube, as described, provided with traps, as described, and with levers $i$ and pawls $h$, arranged as described, with boxes $a$, provided with grooves $g'$ $f'$ and projections $k'$, the whole constructed, arranged, and operated substantially as described.

W. H. JONES.
H. L. RANDALL.

Witnesses:
CHARLES G. C. SIMPSON,
A. A. SIMPSON.